United States Patent [19]

Gabler

[11] 3,744,781
[45] July 10, 1973

[54] METHOD AND APPARATUS FOR GAS STIRRING OF MOLTEN METAL

[75] Inventor: Karl F. Gabler, Brillion, Wis.

[73] Assignee: Beatrice Foods Co., Chicago, Ill.

[22] Filed: June 24, 1971

[21] Appl. No.: 156,435

[52] U.S. Cl................ 266/34 PP, 75/59, 266/34 A
[51] Int. Cl............................................. C21c 7/00
[58] Field of Search ................ 75/59, 61; 266/34 A, 266/34 T, 34 V, 34 PP

[56] References Cited
FOREIGN PATENTS OR APPLICATIONS
555,593  3/1957  Belgium............................ 266/34 A Primary Examiner—Gerald A. Dost
Attorney—John W. Michael et al.

[57] ABSTRACT

A ring-shaped member of porous refractory material is mounted in the refractory lining of a vessel for molten metal and extends around the inner periphery of the vessel. The member has at least a part of its surface area exposed to the molten metal in the vessel. Gas introduced through the ring-shaped member will pass upwardly through the molten bath in the area adjacent the vessel side eall, causing upward movement of the molten metal bath in such area. The upwardly flowing metal moves radially inwardly towards the center at the surface area and then moves downwardly in the central portion of the vessel.

11 Claims, 8 Drawing Figures

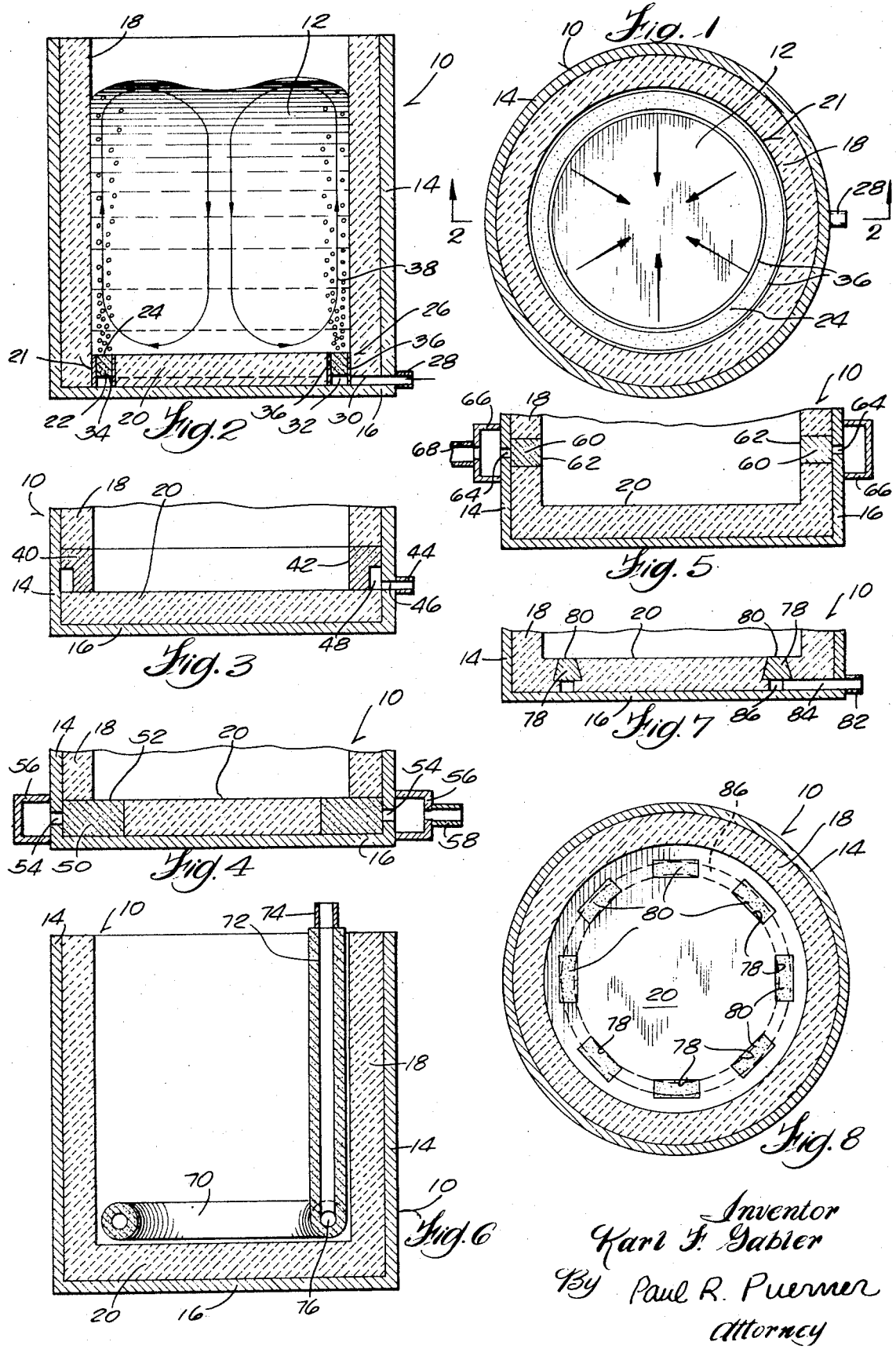

METHOD AND APPARATUS FOR GAS STIRRING OF MOLTEN METAL

BACKGROUND OF INVENTION

1. Field of Invention

This invention relates to a method and apparatus for gas stirring of molten metal in a vessel such as a refractory lined foundry ladle. Stirring of the molten metal may be required for a number of reasons. The usual reason is for creating a mixing action between the molten bath and additives introduced into the ladle. A specific example of one such application of the present invention is the desulfurizing of iron by the addition of calcium carbide to the molten iron in the ladle. Another example is the converting of gray iron to ductile iron by the addition of magnesium alloys.

2. Description of Prior Art

In the past gas stirring of molten metal has been performed by various methods such as the use of a refractory pipe or a porous plug mounted in the bottom of the vessel. Examples of the latter are disclosed in U.S. Pat. Nos. 2,811,346, 2,871,008, 3,343,829. The stirring action produced by prior methods has not been very satisfactory. The principle object of this invention is to provide a superior stirring action as compared to prior methods to thereby produce a more efficient mixing of the additives introduced into the ladle.

SUMMARY OF INVENTION

Apparatus for stirring a molten metal bath in a refractory lined vessel having a side wall and a bottom comprising a gas introduction means mounted inside the vessel. Said means is made from a porous refractory material through which gas flows into the molten metal bath. The gas introduction means is mounted in the lower portion of the vessel and extends substantially around the inner periphery of the vessel so that gas passing into the bath through the porous refractory material will pass upwardly through the bath along the inner wall surface of the vessel. The upwardly moving gas will cause the molten metal to move upwardly from the bottom portion of the vessel along the inner face of the vessel side wall and then at the surface area it will flow radially inwardly toward the center and then downwardly through the central portion of the bath. A gas distribution means is provided for conducting the flow of gas under pressure from outside the vessel to the gas introduction means inside the vessel. In the preferred embodiment the gas introduction means is in the form of a ring-shaped member of porous refractory material mounted in the refractory lining of the vessel.

DESCRIPTION OF DRAWINGS

FIG. 1 is a partially schematic top-plan view of a metallurgical vessel employing the apparatus of the present invention;

FIG. 2 is a vertical sectional view taken along lines 2—2 of FIG. 1;

FIGS. 3, 4, 5, 6 and 7 are vertical sectional views similar to FIG. 2 but showing different embodiments of the invention; and FIG. 8 is a top-plan view of the embodiment shown in FIG. 7.

DESCRIPTION OF PREFERRED EMBODIMENTS

Referring to the drawings in detail, FIGS. 1 and 2 show a vessel 10 containing molten metal indicated by the reference numeral 12. Vessel 10 is comprised of a metallic outer shell or side wall 14 and a metallic bottom 16. The side wall and bottom of the vessel are provided with a refractory lining 18 and 20 respectively. While the vessel 10 may be of various sizes and types, one example of the type of vessel in which the present invention may be usefully employed is a ladle for molten metals.

Referring now to the embodiment of the invention shown in FIGS. 1 and 2, an inert gas such as nitrogen or argon for stirring the molten metal 12 in vessel 10 is introduced into the vessel at the base of the vessel side wall around the inner periphery thereof by a gas introduction means 21 which in the FIGS. 1 and 2 embodiment is comprised of a ring 22 of porous refractory material. The ring is positioned in the bottom portion of the vessel with its upper face 24 flush with the surface of lining 20. The porous refractory material of ring 22 may be of different types such as refractories made from alumina, silica, zircon or silicon carbide.

Gas is introduced into the vessel under pressure and distributed to ring 22 from a suitable external source (not shown) by a distribution means 26 which includes a fitting 28, a passageway 30 and a circular channel 32. Fitting 28 is welded or otherwise mounted to side wall 14 and communicates with channel 32 through passageway 30. Channel 32 is positioned directly beneath the lower face 34 or ring 22. It will be appreciated that the means 26 for distributing the gas to ring 22 may take different forms. In the FIGS. 1 and 2 embodiment passage 30 and channel 32 may be formed by placing sealing wax in the spaces through which gas flow is desired when the porous ring and refractory lining is installed in the vessel. When the refractory lining is fired, the sealing wax will melt and run out of fitting 28, leaving the desired passageway 30 and channel 32.

A suitable sealing material 36, such as refractory cement, is applied at the interface between ring 22 and linings 18 and 20 to prevent any leakage of gas into the refractory linings. This sealing function can also be obtained by using steel plates at the interface between the ring and the lining, or as another alternative a combination of steel plates and refractory cement may also be used.

To produce the unique stirring action of this invention an inert gas such as nitrogen or argon is introduced under pressure into the vessel through fitting 28 which gas will be fairly uniformly distributed to the lower face 34 of ring 22 by the distribution means 26 described above. The pressure of the gas can vary depending on a number of conditions such as vessel size and shape but such pressure will normally fall within the range of about 10-100 p.s.i. The gas passes through the porous refractory ring 22 and enters the molten bath 12 around the base of the vessel side wall. From there the gas bubbles (indicated in FIG. 2 by reference numeral 38) pass upwardly along the inner wall surface of the vessel. This upward movement of gas will impart an upward movement to the molten material in that part of the bath adjacent the vessel side wall. When the gas reaches the top surface of the molten bath it will escape into the atmosphere. The molten metal which has moved upwardly along the vessel side wall will necessarily be displaced by molten metal from the central portion of the bath, causing a downward flow of metal in such central portion. The overall result of this action is to cause the molten metal in the bath to circulate as shown by the arrows in FIG. 2. As thus shown, the metal will flow upwardly from the bottom portion of the vessel along the inner face of the vessel side wall, then at the surface it will flow radially inwardly toward the center (see arrows in FIG. 1), then downwardly through the central portion of the bath and then at the bottom it will flow radially outwardly toward the vessel side wall.

It will be appreciated from the foregoing explanation that the stirring action imparted to the bath will very efficiently and thoroughly stir the entire volume of molten metal in the vessel and will do so without excessive gas pressures and/or gas flow concentrations which may cause spattering of the molten metal. It will also be appreciated that when additives such as calcium carbide for desulfurization are added to the surface of the bath, such materials will be quickly carried to the central portion of the bath and then carried downwardly into the bath where they will be thoroughly and efficiently dispersed throughout the entire volume of the molten metal in the vessel. Such intermixing will take place even with additives having a specific gravity considerably less than that of the molten metal in the vessel.

The radial width of ring 22 can vary to some extent. Experimentation has established, however, that best results can be obtained by using rings having a maximum radial width of about one-quarter of the inner diameter of the vessel. By employing a ring, as described above, experimentation has shown that it is possible to produce a stirring action wherein the velocity of the molten metal moving downwardly in the central portion of the container will be greater than the velocity of the molten metal moving upwardly along the side wall of the vessel. This result is obtained because of the reduced cross-sectional area of the downwardly moving metal as compared with the cross-sectional area of the upwardly moving metal.

Referring now to the embodiments of the invention shown in FIGS. 3–8, FIG. 3 shows an embodiment wherein a porous refractory ring 40 is mounted with its exposed face 42 flush with the side wall refractory lining 18. A fitting 44, passageway 46 and a channel 48 provide a distribution means for conducting gas under pressure from a source outside the vessel to the ring 40.

In the FIG. 4 embodiment a porous refractory ring 50 is mounted with an exposed surface 52 flush with the bottom refractory lining 20. A plurality of circumferentially spaced openings 54 in wall 14, an externally mounted ring-shaped channel member 56 and a fitting 58 provide a distribution means for conducting gas under pressure from a source outside the vessel to the ring 50.

In the FIG. 5 embodiment a porous refractory ring 60 is mounted with its exposed face 62 flush with the side wall refractory lining 18. It will be noted that ring 60 is spaced from the bottom refractory lining 20. To obtain the desired stirring action such spacing should not be more than one-half the vertical depth of the vessel. A plurality of circumferentially spaced openings 64 in wall 14, an externally mounted ring-shaped channel member 66 and a fitting 68 provide a distribution means for conducting gas under pressure from a source outside the vessel to the ring 60.

In the FIG. 6 embodiment the gas introduction means is in the form of a circular-shaped tubular member 70 of porous refractory material mounted on the bottom refractory lining 20 of the vessel. Gas under pressure is conducted to member 70 by means of a pipe 72 of nonporous refractory material which extends up to the top of the vessel for a connection to a gas supply by means of a fitting 74. The gas is distributed around the interior of member 70 by means of an internal passageway 76.

In the FIGS. 7 and 8 embodiment, the gas introduction means is in the form of a plurality of block-shaped member 78 of porous refractory material mounted in bottom refractory lining 20 with their exposed faces 80 flush with the face of the lining. A fitting 82, a passageway 84 and a channel 86 provide a distribution means for conducting gas under pressure from a source outside the vessel to the members 78.

In all embodiments shown in FIGS. 3–8, the stirring action produced by the gas is similar to that previously described with respect to FIGS. 1 and 2. In each instance the gas passes through the porous refractory members and enters the molten bath 12 at or near the base of the vessel side wall. The gas then passes upwardly along the inner wall surface of the vessel and imparts an upward movement to the molten material in that part of the bath adjacent the vessel side wall. When the gas reaches the top surface of the molten bath, it will escape into the atmosphere. The molten metal at the surface will flow radially inwardly toward the center of the vessel and then downwardly through the central portion of the bath and then at the bottom it will flow radially outwardly toward the vessel wall for recirculation as described above.

I claim:

1. Apparatus for stirring a molten metal bath in a refractory lined vessel having a sidewall and a bottom comprising:
   a gas introduction means mounted inside the vessel, said means made from a porous refractory material through which gas flows into the molten metal bath, said gas introduction means mounted in the lower portion of the vessel and extending substantially around the inner periphery of the vessel so that the gas passing through said means into the bath will pass upwardly through the bath along the inner wall surface of the vessel, said gas introduction means being in the form of a ring having at least a part of its surface exposed to the molten metal bath, and
   a gas distribution means for conducting the flow of gas from outside the vessel to said gas introduction means inside the vessel.

2. Apparatus according to claim 1 in which the radial width of said ring is no greater than about one-quarter the inner diameter of the vessel.

3. Apparatus according to claim 1 in which at least a part of the surface of said ring other than the part identified in claim 2 is in communciation with said gas distribution means.

4. Apparatus according to claim 1 in which said exposed surface is substantially flush with the refractory lining of said vessel.

5. Apparatus according to claim 4 in which said exposed surface is substantially flush with the refractory lining on the bottom of said vessel.

6. Apparatus for stirring a molten metal bath in a refractory lined vessel having a sidewall and a bottom comprising:
   a gas introduction means mounted inside the vessel, said means made from a porous refractory material through which gas flows into the molten metal bath, said gas introduction means mounted in the lower portion of the vessel and extending substantially around the inner periphery of the vessel so that the gas passing through said means into the bath will pass upwardly through the bath along the entire inner wall surface of the vessel to thereby cause the molten metal in the bottom portion of the bath to flow upwardly along the inner face of the vessel sidewall around the entire inner periphery of the vessel;

a gas distribution means for conducting the flow of gas from outside the vessel to said gas introduction means inside the vessel.

7. Apparatus according to claim 6 in which said gas introduction means has a surface exposed to the molten metal bath and a second surface in communication with said gas distribution means.

8. Apparatus according to claim 6 in which said gas introduction means is comprised of a plurality of members made of porous refractory material, said members mounted in a circular pattern in the lower portion of said vessel.

9. Apparatus for stirring a molten metal bath in a refractory lined vessel having a sidewall and a bottom comprising:

a gas introduction means mounted inside the vessel, said means made from a porous refractory material through which gas flows into the molten metal bath, said gas introduction means mounted in the lower portion of the vessel and extending substantially around the inner periphery of the vessel so that the gas passing through said means into the bath will pass upwardly through the bath along the inner wall surface of the vessel, said gas introduction means being comprised of a substantially circular member having an internal passageway formed therein, said passageway comprising a part of said gas distribution means for conducting gas through said gas introduction means; and a gas distribution means for conducting the flow of gas from outside the vessel to said gas introduction means inside the vessel.

10. Apparatus for stirring a molten metal bath in a refractory lined vessel having a sidewall and a bottom comprising:

a gas distribution means for conducting the flow of gas under pressure from outside the vessel to the lower portion of the vessel interior; and gas introduction means mounted inside the vessel and adapted to direct the passage of gas from said gas distribution means into the molten metal bath in the vessel, said gas introduction means mounted in the lower portion of the vessel and extending substantially around the inner periphery of the vessel so that gas flowing into the molten metal bath will pass upwardly through the bath along the inner wall surface of the vessel, said gas introduction means including a ring-shaped member of porous refractory material mounted in the refractory lining of the vessel, said member having at least a part of its surface area exposed to the molten metal bath in the vessel.

11. Apparatus for stirring a molten metal bath in a refractory lined vessel having a sidewall and a bottom comprising:

a gas distribution means for conducting the flow of gas under pressure from outside the vessel to the lower portion of the vessel interior; and gas introduction means mounted inside the vessel and adapted to direct the passage of gas from said gas distribution means into the molten metal bath in the vessel, said gas introduction means mounted in the lower portion of the vessel and extending substantially around the inner periphery of the vessel so that gas flowing into the molten metal bath will pass upwardly through the bath along the entire inner wall surface of the vessel to thereby cause the molten metal in the bottom portion of the bath to flow upwardly along the inner face of the vessel sidewall around the entire inner periphery of the vessel.

* * * * *